United States Patent [19]
Obata

[11] Patent Number: 5,328,112
[45] Date of Patent: Jul. 12, 1994

[54] TRANSMISSION APPARATUS BETWEEN TWO RELATIVELY ROTATING MEMBERS

[75] Inventor: Ken Obata, Tokyo, Japan

[73] Assignee: The Furukawa Electric Co., Ltd., Tokyo, Japan

[21] Appl. No.: 994,206

[22] Filed: Dec. 21, 1992

[30] Foreign Application Priority Data

Dec. 24, 1991 [JP]  Japan .............................. 3-111557[U]

[51] Int. Cl.5 ...................... B65H 75/00; G05G 11/00
[52] U.S. Cl. ................ 242/388; 74/484 R; 439/15
[58] Field of Search .............. 74/484 R, 484 H, 485; 475/346; 242/54 R; 439/15, 164

[56] References Cited

U.S. PATENT DOCUMENTS

| | | | |
|---|---|---|---|
| 4,604,912 | 8/1986 | Sugita et al. | 74/484 R |
| 4,844,359 | 7/1989 | Kato | 242/54 R |
| 5,046,951 | 9/1991 | Suzuki | 439/15 |
| 5,102,061 | 4/1992 | Suzuki et al. | 242/54 R |
| 5,174,515 | 12/1992 | Meier | 242/54 R |

FOREIGN PATENT DOCUMENTS 62-168581 10/1987 Japan .

*Primary Examiner*—Leslie A. Braun
*Assistant Examiner*—David W. Laub
*Attorney, Agent, or Firm*—Frishauf, Holtz, Goodman & Woodward

[57] ABSTRACT

A transmission apparatus of the U-turn type in which the extending direction of a flexible flat cable is reversed in the middle of the cable. The apparatus comprises a planet roll located between a center barrel and an outer case. The planet roll is fitted with a planet gear which is in mesh with a sun gear fixed to the center barrel, and an internal gear fixed to the outer case. When the center barrel rotates, the planet roll revolves in the same direction as the rotating direction of the barrel, thereby guiding the U-turn portion of the cable. At the same time, the planet roll rotates around its axis in the direction opposite to the rotating direction of the center barrel, whereby a guide tape is wound on the barrel and wound off the planet roll. The guide tape serves to guide and prevent the cable from slackening, so that the potential rotational frequency of the center barrel can be made high for the cable length.

4 Claims, 3 Drawing Sheets

TRANSMISSION APPARATUS BETWEEN TWO RELATIVELY ROTATING MEMBERS

BACKGROUND OF THE INVENTION

The present invention relates to a transmission apparatus for transmitting electrical signals, optical signals, electric power, etc. between two relatively rotating members by means of a transmission cable which is fixed at both ends individually to the two members and coiled like a spiral spring, and more particularly, to a transmission apparatus of high operating reliability in which possible number of relative rotation of two members can be increased by use of a transmission cable with less turns.

Conventionally, a transmission apparatus which comprises a flexible flat cable (hereinafter referred to as FFC), coiled like a spiral spring, and inner and outer cases containing the same is used for signal transfer between two relatively rotating members, e.g., a steering-shaft-side member of an automobile, as a rotating body, and a steering-column-side member, as a stationary body (Published Unexamined Japanese Utility Model Application No. 62-168581). In this transmission apparatus, two opposite ends of the FFC are fixed individually to the inner and outer cases so that the FFC can be tightened or loosened as the two cases rotate relatively to each other. Thus, signal transmission can be made between the rotating and stationary bodies within a range of rotational angle such that the rotating body, attached to the inner case, for example, can rotate relatively to the stationary body, fitted with the outer case, while tightening or loosening the FFC.

The transmission apparatus of this type is limited to an application such that the rotating body rotates in a reciprocative manner with respect to the stationary body, that is, rotates alternately in either clockwise or counterclockwise directions. Since it includes no sliding-contact portions, this apparatus can constitute a high-reliability transmission line. Meanwhile, the potential frequency or possible number of relative rotation of the inner and outer cases depends on the number of turns of the FFC. In order to increase the possible number of rotations, therefore, the number of turns of the FFC, that is, the FFC length, should be increased. If the number of turns of the FFC is increased, however, the rotatory force of the rotating body cannot be easily transmitted to the whole FFC, so that trouble is liable to be caused such that the whole FFC cannot uniformly move as the rotating body rotates, or the FFC is turned over or bent.

Accordingly, an improved transmission apparatus has conventionally been proposed such that the potential frequency of relative rotation of the inner and outer cases can be increased with less turns of the FFC. In this apparatus, the FFC is formed having a U-turn portion in the middle so that it is wound in one direction on the inner case side and in the opposite direction on the outer case side. In rotating the inner case relatively to the stationary outer case in a direction such that the FFC is wound thereon, according to this proposed apparatus, the U-turn portion of the FFC moves around the inner case, in the same direction as the rotating direction of the inner case. This movement of the U-turn portion cancels half the rotation of the inner case. Also, the rotatory force of the inner case can be satisfactorily transmitted to the whole FFC. Thus, the possible number of rotations can be increased with less turns of the FFC.

If the inner case is rotated in the opposite direction or in a direction such that the FFC is wound off the inner case, however, the FFC slackens, so that the U-turn portion cannot smoothly move in the rotating direction of the inner case. In consequence, the movement of the U-turn portion cannot fulfill its functions to cancel the case rotation and transmit the rotatory force.

Thus, according to the proposed apparatus described above, the movement of the U-turn portion lacks in smoothness, depending on the direction of the case rotation, so that the intended function to increase the rotational frequency of the case with less turns of the FFC cannot be obtained. Also in the proposed apparatus, it is essential for the case to be rotated in a reciprocative manner, that is, the case must inevitably be rotated in a direction such that the U-turn portion cannot smoothly move. Accordingly, the proposed apparatus has not been put into practical use yet.

OBJECT AND SUMMARY OF THE INVENTION

The object of the present invention is to provide a transmission apparatus between two relatively rotating members, in which a transmission cable is Formed having a U-turn portion in the middle so that it can be securely prevented From slackening as inner and outer cases relatively rotate in any directions, while enjoying an advantage such that the frequency of relative rotation of the cases can be increased with less cable turns.

According to the present invention, there is provided a transmission apparatus between two relatively rotating members, which comprises inner and outer cases arranged to be rotatable relatively to each other and disposed coaxially with each other, a transmission cable having inner and outer ends Fixed to the inner and outer cases, respectively, a planet roll arranged for rotation between the inner and outer cases and revolution around the inner case, and means For preventing the transmission cable From slackening as the inner and outer cases rotate relatively to each other. The transmission cable is wound around the inner case, extends from the inner case to the outer case via the planet roll, and extends along the outer case, in the direction opposite to the direction in which the transmission cable is wound around the inner case. The intermediate portion of the transmission cable, which extends along the planet roll, has a U-turn portion at which the extending direction of the transmission cable is reversed.

Preferably, the transmission apparatus further comprises a planet gear attached to the planet roll, a sun gear attached to the inner case, and an internal gear attached to the outer case, the planet gear meshing with the sun gear and the internal gear. Preferably, moreover, the slack preventing means is constituted by a guide tape having inner and outer ends fixed to the inner case and the planet roll, respectively. The inner end portion of the guide tape, along with the inner end portion of the transmission cable, is wound around the inner ease in a manner such that the guide tape is outside the cable, the intermediate portion of the guide tape extends along the planet roll, and the outer end portion of the guide tape is wound around the planet roll in the direction opposite to the direction in which the inner end portion of the guide tape is wound around the inner ease. Preferably, furthermore, the transmission cable is formed of a flexible flat cable.

An advantage of the present invention lies in that the transmission cable can be securely prevented from slackening while enjoying an advantage of the transmission apparatus of the U-turn type such that the possible number of relative rotation of the inner and outer cases can be increased despite the use of the relatively short transmission cable, so that the operation of the transmission apparatus is stable.

BRIEF DESCRIPTION OF THE DRAWINGS

FIG. 8 is a cross-sectional view of a conventional transmission apparatus;

DETAILED DESCRIPTION

Figure 3:
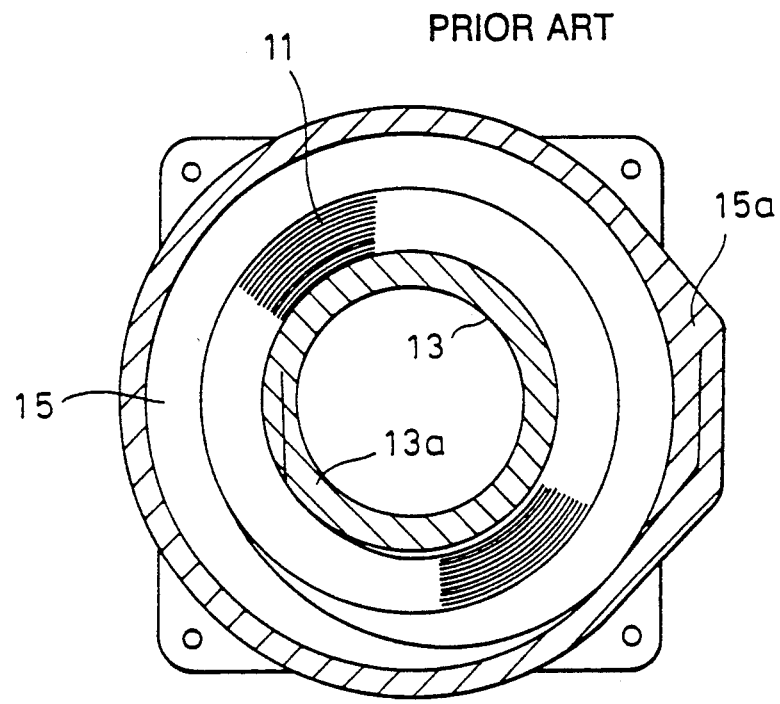
Figure 4:
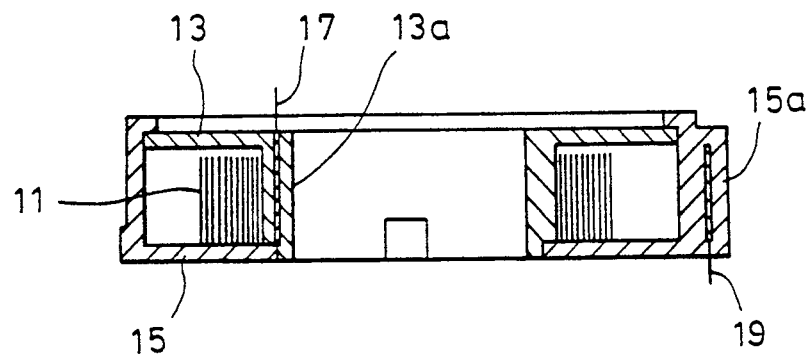
FIG. 4 is a longitudinal sectional view of the conventional apparatus shown in FIG. 4.
Figure 5:
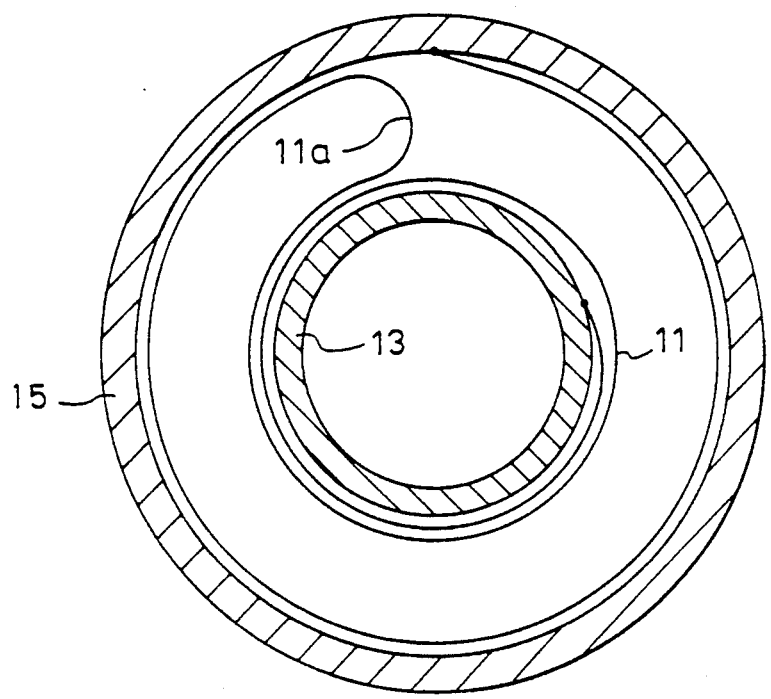
FIG. 5 is a cross-sectional view showing a conventional transmission apparatus of a type such that an FFC is turned in the shape of a U in the middle.

Referring now to FIGS. 3 to 5, the conventional transmission apparatuses of the aforementioned two types will be described again.

The conventional apparatus shown in FIGS. 3 and 4 comprises a flexible flat cable (FFC) 11, coiled like a spiral spring, and inner and outer cases 13 and 15 containing the cable. The inner end of the FFC 11 is fixed to an inner cylinder portion 13a of the inner case 13 and connected to a lead wire 17, which is disposed in the cylinder portion 13a. The outer end of the FFC 11 is fixed to an outer cylinder portion 15a of the outer case 15 and connected to a lead wire 19 disposed in the cylinder portion 15a. The inner and outer cases 13 and 15 are attached to, for example, the steering shaft side, as a rotating body, of an automobile and the steering column side, as a stationary body, respectively, for relative rotation. Thus, signals can be transferred between the rotating and stationary bodies within a range such that the coiled FFC 11 can be tightened and loosened. This transmission apparatus, however, is subject to a drawback such that the FFC is liable to be turned over or bent if its number of turns is increased in order to increase the potential frequency of relative rotation of the inner and outer cases.

The transmission apparatus of FIG. 5 is proposed in order to eliminate this drawback. In this apparatus, an FFC 11, whose opposite ends are fixed individually to inner and outer cases 18 and 15, makes a U-turn in the middle so that the winding direction of its inner half is opposite to that of its outer half. If the inner case 18, in this proposed apparatus, is rotated in the counterclockwise direction with respect to the stationary outer case 15, for example, a U-turn portion 11a of the FFC 11 moves in the counterclockwise direction, thereby canceling half the relative rotation of the cases 18 and 15 and facilitating the transmission of the rotatory force of the inner case to the whole FFC 11. Thus, even if the number of turns and length of the FFC 11 are small and short, respectively, the potential frequency of relative rotation of the inner and outer cases can be increased. When the inner case 18 is rotated in the clockwise direction, however, the FFC 11 is liable to slacken as it is wound off the inner case 18, and the U-turn portion 11a is frequently prevented from moving in the clockwise direction. Accordingly, the inner case 13 cannot enjoy normal rotation.

Figure 1:
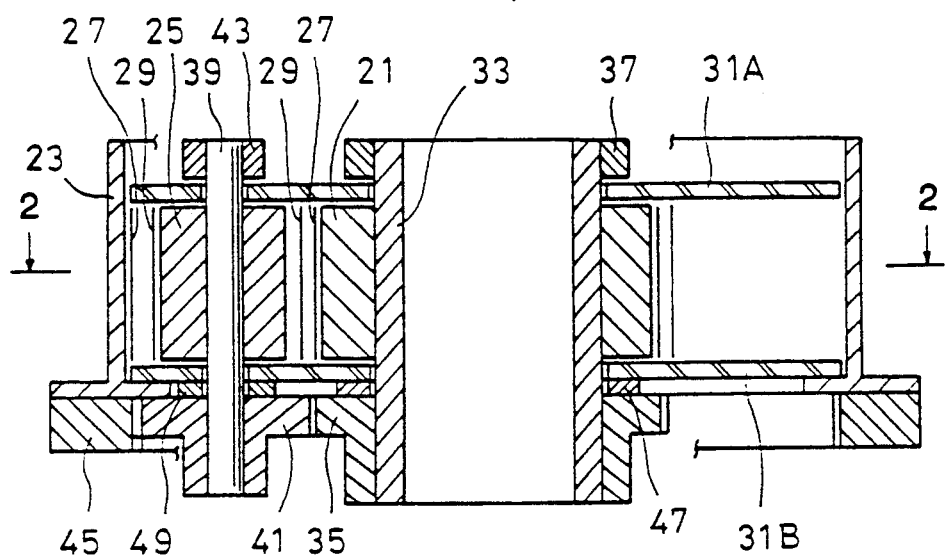
FIG. 1 is a longitudinal sectional view of a transmission apparatus according to one embodiment of the present invention.
Figure 2:
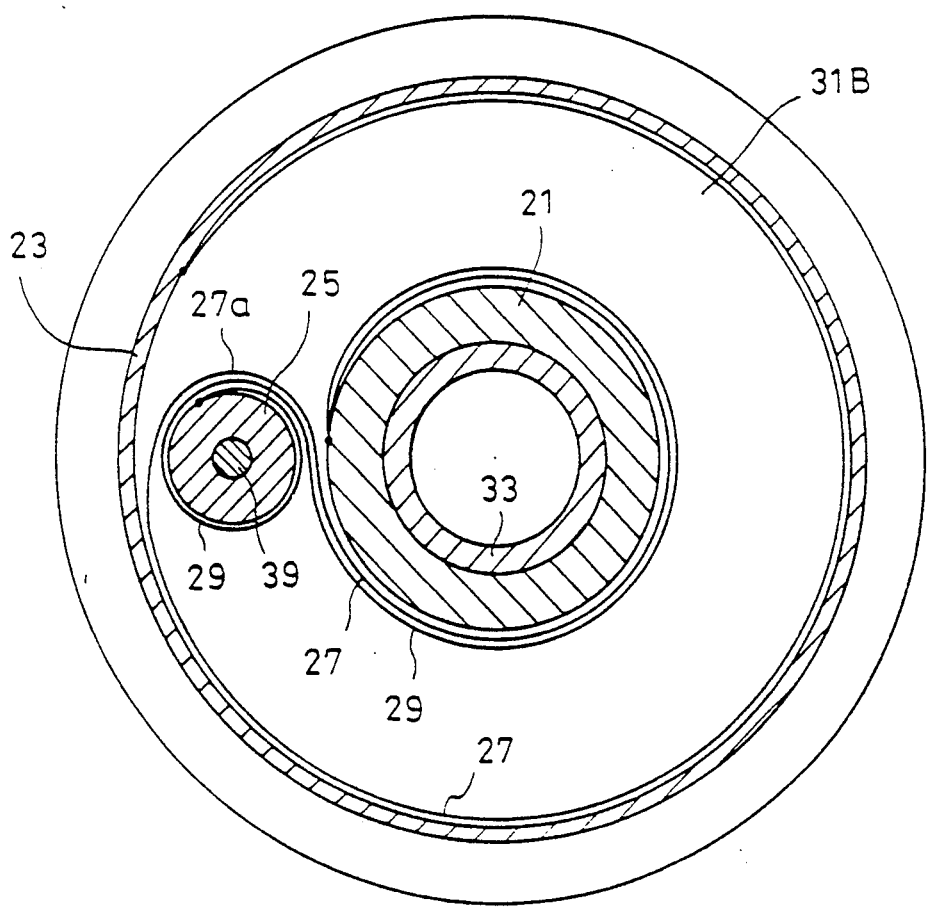
FIG. 2 is a cross-sectional view of the transmission apparatus taken along line 2—2 of FIG. 1.

Referring now to FIGS. 1 and 2, a transmission apparatus according to one embodiment of the present invention will be described.

This transmission apparatus is designed so that signals can be transferred between two relatively rotatable members. As shown in FIGS. 1 and 2, the transmission apparatus comprises an outer case 23, a hollow shaft 33, a center barrel 21 for use as an inner case, and a transmission cable (FFC) 27 having two opposite ends fixed to the barrel 21 and the outer case 23, respectively. The center barrel 21 is mounted on the middle portion, the axial direction, of the hollow shaft 33 for rotation in unison therewith, and is rotatable relatively to the outer case 23.

The inner and outer ends of the transmission cable (FFC) are fixed to the center barrel 21 and the outer case 23, respectively.

The transmission apparatus further comprises annular supports 31A and 31B, which extend horizontally between the hollow shaft 33 and the outer case 23, in axial positions corresponding individually to the upper and lower end faces of the center barrel 21, as shown in FIG. 1, and a sun gear 35 (see FIG. 1) fixed to the lower end portion of the shaft 33. The inner peripheral portion of the annular support 31A is held between the upper end face of the center barrel 21 and a retaining ring 37 on the hollow shaft 33, while the inner peripheral portion of the support 31B is held between the upper end face of the sun gear 85 and the lower end face of the center barrel 21 with a washer 47 sandwiched between them. The supports 31A and 31B serve to position the outer case 23 so that the case 28 is disposed coaxially with the center barrel 21. The FFC 27, along with a guide tape 29 (mentioned later) as means for preventing the FFC 27 from slackening as the center barrel 21 rotates, is housed in a space which is defined by the barrel 21, outer case 23, and supports 31A and 31B.

Through holes are bored individually through the supports 31A and 31B, and a shaft 39 extends through these holes and in parallel to the hollow shaft 38. A planet roll 25 is mounted on the middle portion of the shaft 39 for rotation in unison therewith. The roll 25 is located between the center barrel 21 and outer case 28 in the radial direction of the transmission apparatus, and between the supports 31A and 31B in the axial direction of the apparatus. A planet gear 41 is mounted on the lower end portion of the shaft 39 for rotation in unison therewith, and the shaft 39 is prevented from being disengaged from the supports 31A and 31B by means of the gear 41 and a retaining ring 48 on the upper end portion of the shaft 39. A washer 49 is interposed between the planet gear 41 and the support 31B. Further, the planet gear 41 is in mesh with both the sun gear 35 and an internal gear 45, which is fixed on the lower end face of the outer peripheral portion of the outer case 23 coaxially with the sun gear 35. The planet gear 41 is arranged to revolve around the sun gear 35 and rotate around the shaft 39, as the sun gear 35 rotates.

The guide tape 29 serves to guide the FFC 27, which is wound on or off the center barrel 21 as the barrel 21 rotates. Preferably, the inner end of the tape 29 is fixed to the center barrel 21 in a position substantially coincident with the position where the inner end of the FFC 27 is fixed, as shown in FIG. 2. The respective inner end portions of the FFC 27 and the guide tape 29 are wound, for example, in the clockwise direction around the outer peripheral surface of the center barrel 21 with the tape 29 outside, so that the FFC 27 and the tape 29 can be taken up when the barrel 21 rotates in the counterclockwise direction. The respective intermediate portions of the FFC 27 and the guide tape 29 extend from the center barrel 21 toward the planet roll 25, and then extend substantially half around the outer peripheral surface of the roll 25, thus forming an extending direction reversal portion, i.e., a U-turn portion, around the planet roll 25. In FIG. 2, numeral 27a denotes the U-turn portion of the FFC 27. Further, the outer end portion of the guide tape 29 is wound around the planet roll 25 in the direction (e.g., counterclockwise direction) opposite to the direction in which the respective inner end portions of the FFC 27 and the tape 29 are wound around the center barrel 21. The outer end portion of the FFC 27 extends from the planet roll 25 to the outer case 23, and then extends along the inner peripheral surface of the case 23, in the direction (e.g., counterclockwise direction) opposite to the direction in which the inner end portion of the FFC 27 is wound around the center barrel 21. The outer end of the FFC 27 is fixed to the inner peripheral surface of the outer case 23.

The following is a description of the operation of the transmission apparatus constructed in the above manner.

When the hollow shaft 33 and the center barrel 21, along with the steering shaft (not shown), rotate in the counterclockwise direction of FIG. 2 as a driver turns the steering wheel in the counterclockwise direction, the planet gear 41, which is in mesh with both the sun gear 35, integrally rotatable with the hollow shaft 33 an the center barrel 21, and internal gear 45, fixed to the outer case 23 fixed on the steering column side, revolves in the counterclockwise direction around the barrel 21 while rotating in the clockwise direction around the shaft 39. The planet roll 25, which is connected integrally with the planet gear 41 by means of the shaft 39, rotates and revolves in like manner.

As the center barrel 21 rotates in the counterclockwise direction, the respective inner end portions of the FFC 27 and the guide tape 29 are wound on the barrel 21, the outer end portion of the tape 29 is wound off the planet roll 25 which rotates in the clockwise direction around its axis, and the outer end portion of the FFC 27 is pulled from the inner peripheral surface of the outer case 23. At the same time, the U-turn portion 27a of the FFC 27 moves in the revolving direction (counterclockwise direction) of the planet roll 25.

Here it is to be noted that the length of that portion of the guide tape 29 which is wound on the center barrel 21 as the barrel 21 rotates is equal to the length of that portion of the tape 29 which is wound off the planet roll 25 as the roll 25 rotates around its axis, and that the revolving speed (revolution angle) of the planet roll 25 is adjusted so that the moving speed (movement angle) of the U-turn portion 27a of the FFC 27 takes a required value. This can be achieved by suitably setting the respective pitch diameters of the sun gear 35, planet gear 41, and internal gear 48, the respective dimensions of the center barrel 21, outer case 28, and planet roll 28, etc.

Thus, the respective lengths of those portions of the guide tape 29 which are wound on and off as the center barrel 21 rotates are equal, and the moving speed of the U-turn portion 27a has the required value. Also, the inner end portion of the FFC 27 is compulsorily brought close to the center barrel 21 by means of that portion of the guide tape 29 which is situated outside the FFC 27. Without regard to the revolution angle position of the planet roll 25, therefore, the path of travel of the FFC 27 along the elements 21, 25 and 28 shown in FIG. 2 can be maintained at all times, so that the FFC 27 hardly slackens. Thus, the rotatory force of the center barrel 21 can be satisfactorily transmitted to the whole FFC 27, so that the FFC 27 can smoothly move along the path of travel. Further, the movement of the U-turn portion 27a cancels half the rotation of the center barrel 21, so that the barrel 21 or the steering shaft is permitted to make a greater number of rotation with respect to the outer case 28 or the steering column, by means of the FFC 27 with a relatively short length.

When the center barrel 21 is rotated in the clockwise direction of FIG. 2 by turning the steering wheel in the clockwise direction, the planet roll 25 revolves in the clockwise direction around the barrel 21 while rotating in the counterclockwise direction around the shaft 39. As the center barrel 21 rotates in the clockwise direction, the respective inner end portions of the FFC 27 and the guide tape 29 are wound off the barrel 21. Meanwhile, the outer end portion of the tape 29 is wound on the planet roll 25 which rotates in the counterclockwise direction around its axis, and the outer end portion of the FFC 27 extends along the inner peripheral surface of the outer case 23. At the same time, the U-turn portion 27a of the FFC 27 moves in the revolving direction (clockwise direction) of the planet roll 25.

When the center barrel 21 rotates in the clockwise direction, as in the case where it rotates in the counterclockwise direction, the respective lengths of those portions of the guide tape 29 which are wound on and off as the barrel 21 rotates are equal, the U-turn portion 27a moves in the required speed, and the inner end portion of the FFC 27 is compulsorily brought close to the barrel 21 by means of the guide tape 29. In the apparatus arranged in this manner, the path of travel of the FFC 27 shown in FIG. 2 can be maintained at all times. In consequence, the FFC 27 hardly slackens, and therefore, hardly any trouble can be caused by the FFC slackening.

As described above, the respective pitch diameters of the gears 85, 41 and 45, the respective inside and outside diameters of the center barrel 21, outer case 23, and planet roll 25, etc. can be suitably set so that the revolution angle of the roll 25, based on the rotation of the barrel 21, is substantially equal to the required movement angle of the U-turn portion 27a of the FFC 27, and that the rotation number (wind-on or -off length of the guide tape 29) of the roll 25 around its axis is substantially equivalent to the length of that portion of the tape 29 which is wound on or off the barrel 21. If the pitch diameters of the sun gear 35, internal gear 45, and planet gear 41 are S, U and P, respectively, the rotation number R and revolution number V of the planet gear 41 are given by $R = (U \times S)/(S + U)$, and $V = S/(S + U)$, respectively.

The following is a description of the specifications of a transmission apparatus manufactured on an experimental basis in accordance with the aforesaid requirements.

Sun gear: 48 mm (pitch diameter), 60 (number of teeth).

Planet gear: 24 mm (pitch diameter), 30 (number of teeth).

Internal gear: 96 mm (pitch diameter), 120 (number of teeth).

Gear module: 0.8.

FFC thickness: 0.31 mm.

Guide tape thickness: 0.13 mm (PET film).

Outside diameter of center barrel: 46 mm.

Inside diameter of outer case: 105 mm (95.8 mm based on calculation plus allowance).

Outside diameter of planet roll: 22.8 mm. FFC length: 650 mm (598 mm based on calculation plus allowance for the U-turn portion).

Guide tape length: 600 mm.

Although the FFC and the guide tape are liable to slacken in some measure, in the transmission apparatus thus manufactured by way of trial according to these specifications, the U-turn portion of the FFC can securely move without any practical problem.

It is to be understood that the present invention is not limited to the embodiment described above, and that various changes and modifications may be effected therein by one skilled in the art without departing from the scope or spirit of the invention.

In the foregoing embodiment, for example, the guide tape 29 is used as the slacking preventing means for the transmission cable. Alternatively, however, other slack preventing means, such as a guide roll which is arranged to slidably hold the transmission cable between itself and the planet roll 25, may be employed.

What is claimed is:

1. A transmission apparatus arranged between two relatively rotating members, comprising:
   an inner case;
   an outer case, said inner and outer cases being arranged to be rotatable relative to each other and disposed coaxially with respect to each other;
   a transmission cable having inner and outer ends fixed to said inner and outer cases, respectively;
   a planet roll arranged for rotation between said inner and outer cases and for revolution around said inner case, said transmission cable being wound around said inner case in a given direction, and said transmission cable extending from said inner case to said outer case via said planet roll, and said transmission cable also extending along said outer case in a direction opposite to the given direction in which the transmission cable is wound around said inner case, said transmission cable having an intermediate portion which extends along said planet roll and which has a U-turn portion at which the extending direction of said transmission cable is reversed; and
   slack preventing means for preventing said transmission cable from slackening as said inner and outer cases rotate relative to each other;
   said slack preventing means comprising a guide tape having inner and outer ends fixed to said inner case and to said planet roll, respectively;
   an inner end portion of said guide tape, along with said inner end portion of said transmission cable, being wound around said inner case such that said guide tape is outside of said transmission cable;
   an intermediate portion of said guide tape extending along said planet roll; and
   an outer end portion of said guide tape being wound around said planet roll in a direction opposite to a direction in which said inner end portion of said guide tape is wound around said inner case.

2. A transmission apparatus arranged between two relatively rotating members, comprising:
   an inner case;
   an outer case, said inner and outer cases being arranged to be rotatable relative to each other and disposed coaxially with respect to each other;
   a transmission cable having inner and outer ends fixed to said inner and outer cases, respectively;
   a planet roll arranged for rotation between said inner and outer cases and for revolution around said inner case, said transmission cable being wound around said inner case in a given direction, and said transmission cable extending from said inner case to said outer case via said planet roll, and said transmission cable also extending along said outer case in a direction opposite to the given direction in which the transmission cable is wound around said inner case, said transmission cable having an intermediate portion which extends along said planet roll and which has a U-turn portion at which the extending direction of said transmission cable is reversed; and
   slack preventing means for preventing said transmission cable from slackening as said inner and outer cases rotate relative to each other;
   said slack preventing means comprising:
      a guide tape having inner and outer ends fixed to said inner case and to said planet roll, respectively;
      an inner end portion of said guide tape, along with an inner end portion of said transmission cable, being wound around said inner case such that said guide tape is outside of said transmission cable;
      an intermediate portion of said guide tape extending along said planet roll; and
      an outer end portion of said guide tape being wound around said planet roll in a direction opposite to a direction in which said inner end portion of said guide tape is wound around said inner case;
   a planet gear attached to said planet roll;
   a sun gear attached to said inner case; and
   an internal gear attached to said outer case, said planet gear meshing with said sun gear and said internal gear.

3. The transmission apparatus according to claim 1, wherein said transmission cable comprises a flexible flat cable.

4. The transmission apparatus according to claim 2, wherein said transmission cable comprises a flexible flat cable.

* * * * *